(12) United States Patent
Smith et al.

(10) Patent No.: US 8,902,051 B2
(45) Date of Patent: Dec. 2, 2014

(54) REALISTIC TACTILE HAPTIC FEEDBACK DEVICE AND REALISTIC TACTILE HAPTIC FEEDBACK METHOD THEREOF

(71) Applicant: National Taiwan University, Taipei (TW)

(72) Inventors: Shana S. Smith, New Taipei (TW); Gregory C. Smith, New Taipei (TW); Ji-Liang Lee, Taipei (TW)

(73) Assignee: National Taiwan University, Taipei (TW)

( * ) Notice: Subject to any disclaimer, the term of this patent is extended or adjusted under 35 U.S.C. 154(b) by 29 days.

(21) Appl. No.: 13/845,282

(22) Filed: Mar. 18, 2013

(65) Prior Publication Data

US 2014/0125469 A1    May 8, 2014

(30) Foreign Application Priority Data

Nov. 5, 2012    (TW) .............................. 101140966 A (51) Int. Cl.
*G08B 6/00*    (2006.01)

(52) U.S. Cl.
USPC ...................................... 340/407.2; 340/407.1

(58) Field of Classification Search
USPC ............ 340/407.1, 407.2, 505, 573; 345/156, 345/173, 174; 455/550.1; 463/37
See application file for complete search history.

(56) References Cited

U.S. PATENT DOCUMENTS

| | | | |
|---|---|---|---|
| 8,369,887 B2 * | 2/2013 | Choe et al. ................. | 455/550.1 |
| 2010/0245237 A1 * | 9/2010 | Nakamura .................... | 345/156 |
| 2012/0108337 A1 * | 5/2012 | Kelly et al. ..................... | 463/37 |
| 2013/0207791 A1 * | 8/2013 | Olsson et al. .............. | 340/407.1 |

* cited by examiner

*Primary Examiner* — Van T. Trieu
(74) *Attorney, Agent, or Firm* — Li & Cai Intellectual Property (USA) Office (57) ABSTRACT

A realistic tactile haptic device comprising a first vibration sensor, a digital controller, an actuator, and a similar or identical second vibration sensor, and a realistic tactile haptic feedback method thereof, provides users with realistic tactile haptic feedback that is similar to or the same as real tactile haptic feedback which users would experience by touching real objects.

12 Claims, 6 Drawing Sheets

REALISTIC TACTILE HAPTIC FEEDBACK DEVICE AND REALISTIC TACTILE HAPTIC FEEDBACK METHOD THEREOF

BACKGROUND

1. Technical Field

The present disclosure relates to a realistic tactile haptic feedback device and a realistic tactile haptic feedback method thereof. Moreover, the present disclosure relates to a realistic tactile haptic feedback device that is small, light, and cost effective.

2. Description of Related Art

Remote-control systems, computer-aided design tools, educational systems, scientific equipment, computer systems, and electronic devices comprising teleoperators or virtual environments are now widely used by engineers, designers, students, scientists, computer users, and electronic device users. Teleoperators and virtual environments comprising displays, speakers, and conventional haptic feedback devices can provide users with sights, sounds, and haptic feedback. Displays and speakers can provide users with realistic sights and sounds that are similar to or the same as sights and sounds which users would experience by interacting directly with real objects. However, conventional haptic feedback devices cannot provide users with realistic tactile haptic feedback that is similar to or the same as real tactile haptic feedback which users would experience by interacting directly with real objects. In addition, conventional haptic feedback devices are not small, light, and cost effective. Realistic tactile haptic feedback devices could provide users with realistic tactile haptic feedback that is similar to or the same as real tactile haptic feedback which users would experience by interacting directly with real objects. In addition, realistic tactile haptic devices that are small, light, and cost effective could be used in remote-control systems, computer-aided design tools, educational systems, scientific equipment, computer systems, and electronic devices.

As a first example, teleoperators comprising remote-control systems, displays, speakers, and realistic tactile haptic feedback devices could provide engineers with realistic tactile haptic feedback that is similar to or the same as real tactile haptic feedback which engineers would experience by interacting directly with remote objects.

As a second example, virtual environments comprising computer-aided-design tools, displays, speakers, and realistic tactile haptic feedback devices could provide designers with realistic tactile haptic feedback that is similar to or the same as real tactile haptic feedback designers would experience by interacting directly with real products.

As a third example, virtual environments comprising scientific equipment, displays, speakers, and realistic tactile haptic feedback devices could provide scientists with realistic tactile haptic feedback that is similar to or the same as real tactile haptic feedback which scientists would experience by interacting directly with virtual (synthetic) microscopic objects derived from real objects.

As a fourth example, virtual environments comprising computer systems, displays, speakers, and realistic tactile haptic devices that are small, light, and cost effective could provide computer users with realistic tactile haptic feedback that is similar to or the same as real tactile haptic feedback which computer users would experience by interacting directly with remote objects, real objects, or virtual (synthetic) objects derived from real objects

SUMMARY

An exemplary embodiment of the present disclosure provides a realistic tactile haptic feedback device, comprising a first sensor, a controller, an actuator, and a second sensor, and a realistic tactile haptic feedback method thereof; wherein the device is small, light, and cost effective, so as to be practically useful.

The device can operate in training mode or normal mode. The controller must be trained, in training mode, before the controller can operate in normal mode. Training the controller comprises identifying the transfer function thereof.

In training mode, the controller sequentially generates a plurality of training signals, the actuator sequentially transforms the plurality of training signals into a plurality of tactile haptic features, the second sensor sequentially transforms the plurality of tactile haptic features from the actuator into a plurality of second sensor signals, and the controller identifies the transfer function thereof by which the controller can sequentially transform the plurality of second sensor signals into the plurality of training signals.

In normal mode, the first sensor transforms real tactile haptic features from real objects into first sensor signals, the controller transforms the first sensor signals into controller signals according to the identified transfer function thereof, the actuator transforms the controller signals into realistic tactile haptic features that are similar to or the same as real tactile haptic features from real objects, the second sensor transforms the realistic tactile haptic features from the actuator into second sensor signals, the controller compares the first sensor signals and the second sensor signals, verifies that the first sensor signals and the second sensor signals are similar or the same, and retrains the controller if the first sensor signals and the second vibration sensor signals are not similar or the same, and, when users touch the actuator, the device provides users with realistic tactile haptic feedback that is similar to or the same as real tactile haptic feedback which users would experience by touching real objects.

Accordingly, an exemplary embodiment of the present disclosure provides a realistic tactile haptic feedback device, comprising a first sensor, a controller, an actuator, and a second sensor, and a realistic tactile haptic feedback method thereof, wherein the device is small, light, and cost effective, so as to be practically useful, and wherein the device provides users with realistic tactile haptic feedback that is similar to or the same as real tactile haptic feedback which users would experience by touching real objects.

Accordingly, an exemplary application of an exemplary embodiment is a teleoperator or virtual environment comprising a display, speakers, and a realistic tactile haptic feedback device that provides users with sights, sounds, and realistic tactile haptic feedback that is similar to or the same as real tactile haptic feedback which users would experience by touching remote objects, real objects, or virtual (synthetic) objects derived from real objects, across space, time, dimension, and reality limitations, wherein realistic tactile haptic feedback that is similar to or the same as real tactile haptic feedback which users would experience by touching remote objects, real objects, or virtual (synthetic) objects derived from real objects, across space, time, dimension, and reality limitations, is realistic position, shape, flexibility, surface texture, or temperature feedback that is similar to or the same as real position, shape, flexibility, surface texture, or temperature feedback which users would experience by touching remote objects, real objects, or virtual (synthetic) objects derived from real objects, across space, time, dimension, or reality limitations.

Accordingly, remote-control devices, computer-aided design tools, educational systems, scientific equipment, computer systems, and electronic devices comprising teleoperators or virtual environments are now widely used by engineers, designers, students, scientists, computer users, and electronic device users.

Accordingly, teleoperators or virtual environments comprising displays, speakers, and realistic tactile haptic feedback devices could provide users with sights, sounds, and realistic tactile haptic feedback which users would experience by interacting directly with remote objects, real objects, or virtual (synthetic) objects derived from real objects, across space, time, dimension, and reality limitations.

Accordingly, realistic tactile haptic devices could provide users with realistic tactile haptic feedback that is similar to or the same as real tactile haptic feedback which users would experience by touching real objects.

Accordingly, realistic tactile haptic devices that are small, light, and cost effective could be used in remote-control systems, computer-aided design tools, educational systems, scientific equipment, computer systems, and electronic devices.

BRIEF DESCRIPTION OF THE DRAWINGS

In order to further understand the techniques, means, and effects of the present disclosure, the following descriptions and accompanying drawings are hereby referred to, such that, through which, the purposes, principles, features, and aspects of the present disclosure can be fully appreciated.

The following descriptions and accompanying drawings illustrate exemplary embodiments of the present disclosure which serve to explain the purposes, principles, features, and aspects of the present disclosure. The following descriptions and accompanying drawings are merely provided for reference and illustration, and are not intended to limit the present disclosure in any manner.

DESCRIPTIONS OF EXEMPLARY EMBODIMENTS

Description of a First Exemplary Embodiment

A first exemplary embodiment of the present disclosure provides a realistic tactile haptic feedback device, comprising a first vibration sensor, a digital controller, an actuator, and a similar or identical second vibration sensor, and a realistic tactile haptic feedback method thereof, wherein the device is small, light, and cost effective, so as to be practically useful, and wherein the device provides users with realistic tactile haptic feedback that is similar to or the same as real tactile haptic feedback which users would experience by touching real objects.

The realistic tactile haptic device can operate in training mode or normal mode. The digital controller must be trained, in training mode, before the digital controller can operate in normal mode. Training the digital controller comprises identifying the transfer function thereof.

In training mode, the digital controller sequentially generates a plurality of training signals, the actuator sequentially transforms the plurality of training signals into a plurality of vibrations, the similar or identical second vibration sensor sequentially transforms the plurality of vibrations from the actuator into a plurality of second vibration sensor signals, and the digital controller sequentially transforms the plurality of second vibration sensor signals into a plurality of second vibration sensor signal samples, sequentially transforms the plurality of training signals into a plurality of training signal samples, and identifies the transfer function thereof by which the digital controller can sequentially transform the plurality of second vibration sensor signal samples into the plurality of training signal samples.

In normal mode, the first vibration sensor transforms real vibrations from real objects into first vibration sensor signals, the digital controller transforms the first vibration sensor signals into first vibration sensor signal samples, transforms the first vibrations sensor signal samples into controller signal samples according to the identified transfer function thereof, and transforms the controller signal samples into controller signals, the actuator transforms the controller signals into realistic vibrations that are similar to or the same as real vibrations from real objects, the similar or identical second vibration sensor transforms the realistic vibrations from the actuator into second vibration sensor signals, the digital controller transforms the second vibration sensor signals into second vibration sensor signal samples, compares the first vibration sensor signal samples and the second vibration sensor signal samples, verifies that the first vibration sensor signal samples and the second vibration sensor signal samples are similar or the same, and retrains the digital controller if the first vibration sensor signal samples and the second vibration sensor signal samples are not similar or the same, and, when users touch the actuator, the device provides users with realistic tactile haptic feedback that is similar to or the same as real tactile haptic feedback which users would experience by touching real objects.

In training mode, the realistic tactile haptic feedback device uses the digital controller, the actuator, and the similar or identical second vibration sensor to identify the transfer function of the digital controller.

In normal mode, the realistic tactile haptic feedback device uses the first vibration sensor, the digital controller, the actuator, and the similar or identical second vibration sensor to provide users with realistic tactile haptic feedback that is similar to or the same as real tactile haptic feedback which users would experience by touching real objects.

Reference will now be made, in detail, to the accompanying drawings which illustrate the aforementioned first exemplary embodiment of the present disclosure. The same reference numbers are used in the description and in the accompanying drawings to refer to the same or like parts.

Figure 1A:
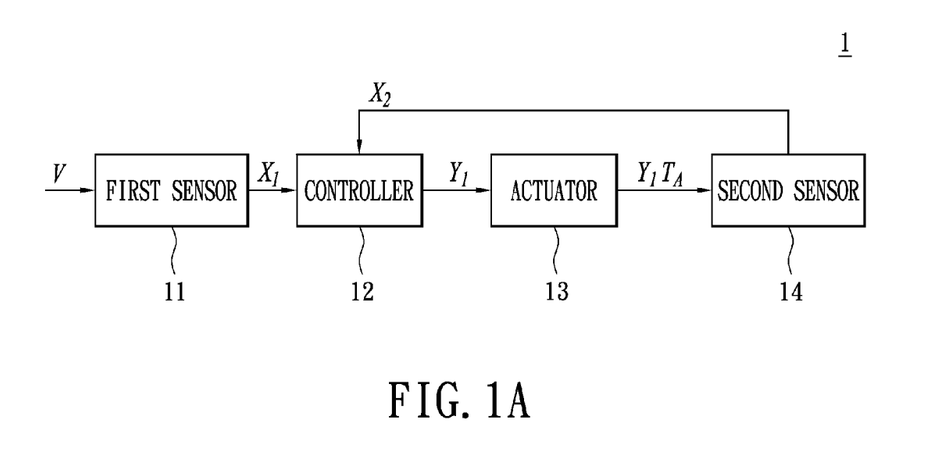
FIG. 1A is a block diagram of a first exemplary embodiment of the present disclosure.

Referring to FIG. 1A, FIG. 1A is a block diagram of a first exemplary embodiment of the present disclosure.

Accordingly, a first exemplary embodiment of the present disclosure provides a realistic tactile haptic feedback device 1 comprising a first vibration sensor 11, a digital controller 12, an actuator 13, and a similar or identical second vibration sensor 14, and a realistic tactile haptic feedback method thereof, wherein the device is small, light, and cost effective, so as to be practically useful, and wherein the device 1 provides users with realistic tactile haptic feedback that is similar to or the same as real tactile haptic feedback which users would experience by touching real objects.

Accordingly, the realistic tactile haptic device 1 can operate in training mode or normal mode. The digital controller 12 must be trained, in training mode, before the digital controller 12 can operate in normal mode.

Accordingly, in training mode, the realistic tactile haptic feedback device 1 uses the digital controller 12, the actuator 13, and the similar or identical second vibration sensor 14 to identify the transfer function of the digital controller 12, wherein the transfer function of the digital controller 12 is related to the transfer function $T_A$ of the actuator 13, the transfer function $T_s$ of the similar or identical first and second vibration sensors 11 and 14, the transfer function $I_1$ of the installation effects of the first vibration sensor 11 which is installed on the surfaces of real objects, and the transfer function $I_2$ of the installation effects of the similar or identical second vibration sensor 14 which is installed on the surface of the actuator 13.

Accordingly, in normal mode, the realistic tactile haptic feedback device uses the first vibration sensor 11, the digital controller 12, the actuator 13, and the similar or identical second vibration sensor 14 to provide users with realistic tactile haptic feedback that is similar to or the same as real tactile haptic feedback which users would experience by touching real objects, wherein the first vibration sensor 11 transforms real vibrations V from real objects into first vibration sensor signals $X_1$, the digital controller 12 transforms first vibration sensor signals $X_1$ into first vibration sensor signal samples by sampling first vibration sensor signal magnitudes at a plurality of sampling time points, transforms the first vibration sensor signal samples into controller signal samples comprising controller signal magnitudes at the same plurality of sampling time points according to the identified transfer function thereof, and transforms the controller signal samples into controller signals $Y_1$, the actuator 13 transforms controller signals $Y_1$ into realistic vibrations $Y_1 T_A$ that are similar to or the same as real vibrations V from real objects according to the transfer function $T_A$ of the actuator, the second vibration sensor 14 transforms the realistic vibrations $Y_1 T_A$ from the actuator into second vibration sensor signals $X_2$, the digital controller 12 transforms the second vibration sensor signals $X_2$ into second vibration sensor signal samples by sampling second vibration sensor signal magnitudes at the same plurality of sampling time points, compares the first vibration sensor signal samples and the second vibration sensor signal samples, verifies that the first vibration sensor signal samples and the second vibration sensor signal samples are similar or the same, and retrains the digital controller 12 if the first vibration sensor signal samples and the second vibration sensor signal samples are not similar or the same, and, when users touch the actuator 13, the device 1 provides users with realistic tactile haptic feedback that is similar to or the same as real tactile haptic feedback which users would experience by touching real objects.

Accordingly, in normal mode, the first vibration sensor signals $X_1 = V T_s I_1$, wherein V are real vibrations from real objects, $T_s$ is the transfer function of the first vibration sensor 11 and the similar or identical second vibration sensor 14, and $I_1$ is the transfer function of the installation effects of the first vibration sensor 11 which is installed on the surfaces of real objects.

Accordingly, in normal mode, the second vibration sensor signals $X_2 = Y_1 T_A T_s I_2$, wherein $Y_1 T_A$ are realistic vibrations from the actuator 13, $T_s$ is the transfer function of the first vibration sensor 11 and the similar or identical second vibration sensor 14, and $I_2$ is the transfer function of the installation effects of the second vibration sensor 14 which is installed on the surface of the actuator.

Accordingly, when the device 1 provides users with realistic tactile haptic feedback that is similar to or the same as real tactile haptic feedback which users would experience by touching real objects, realistic vibrations $Y_1 T_A$ from the actuator 13 and real vibrations V from real objects are similar or the same, and second vibration sensor signals $X_2$ and first vibration sensor signals $X_1$ are similar or the same.

Accordingly, when the first vibration sensor 11 is installed on the surfaces of real objects in similar ways or the same way as the similar or identical second vibration sensor 14 is installed on the surface of the actuator 13, installation effects of the first vibration sensor 11 and installation effects of the second vibration sensor 14 are similar or the same, the transfer function of the installation effects of the first vibration sensor $I_1$ and the transfer function of the installation effects of the similar or identical second vibration sensor $I_2$ are similar or the same, controller signals $Y_1 = X_1 (T_A T_s I_2)^{-1}$, and hence the transfer function of the digital controller 12 is $(T_A T_s I_2)^{-1}$.

Accordingly, in training mode, the digital controller 12 can identify the transfer function thereof by identifying the transfer function of the actuator 13, the transfer function of the similar or identical second sensor 14, and the transfer function of the installation effects of the similar or identical second sensor 14 or, equivalently, by identifying the transfer function of the actuator 13 and the similar or identical second sensor 14 which is installed on the surface of the actuator 13, wherein the first vibration sensor 11 is installed on the surfaces of real objects in similar ways or the same way as the similar or identical second vibration sensor 14 is installed on the surface of the actuator 13.

Accordingly, the first vibration sensor 11 is installed on the surfaces of real objects in similar ways or the same way as the similar or identical second vibration sensor 14 is installed on the surface of the actuator 13, by installing the contactor of the first vibration sensor 11 on the surfaces of real objects with similar contact angles or the same contact angle and similar contact forces or the same contact force by which the similar or identical second vibration sensor 14 is installed on the surface of the actuator 13.

Accordingly, in training mode, the digital controller 12 sequentially generates a plurality of training signals $Y_1$, the actuator 13 sequentially transforms the plurality of training signals $Y_1$ into a plurality of vibrations $Y_1 T_A$ according to the transfer function of the actuator $T_A$, the second vibration sensor 14 sequentially transforms the plurality of vibrations $Y_1 T_A$ from the actuator 13 into a plurality of second vibration sensor signals $X_2$, and the digital controller 12 uses a transfer function identifying method to identify the transfer function $(T_A T_s I_2)^{-1}$ thereof by which the digital controller 12 can sequentially transform the plurality of second vibration sensor signals $X_2$ into the plurality of training signals $Y_1$.

Accordingly, the implementation of the transfer function identifying method which the digital controller 12 uses to identify the transfer function $(T_A T_s I_2)^{-1}$ thereof can be any transfer function identifying method. The implementation of the transfer function identifying method used by the digital controller 12 to identify the transfer function $(T_A T_s I_2)^{-1}$ thereof is not intended to limit the present disclosure or exemplary embodiments thereof.

Accordingly, the implementation of the transfer function identifying method used by the digital controller 12 to identify the transfer function $(T_A T_s I_2)^{-1}$ thereof can be system identification, neural network training, or iterative least squares estimation, wherein the digital controller 12 can use system identification, neural network training, or iterative least squares estimation to identify the transfer function $(T_A T_s I_2)^{-1}$ thereof by which the digital controller 12 can sequentially transform the plurality of second vibration signal samples into the plurality of training signal samples. However, the implementation of the transfer function identifying method used by the digital controller 12 to identify the transfer function $(T_A T_S I_2)^{-1}$ thereof is not limited thereto.

Accordingly, the implementation of the plurality of training signals $Y_1$ sequentially generated by the digital controller 12 can be any plurality of training signals $Y_1$. The implementation of the training signals $Y_1$ generated by the digital controller 12 is not intended to limit the present disclosure or exemplary embodiments thereof.

Accordingly, the implementation of the plurality of training signals $Y_1$ sequentially generated by the digital controller 12 can be triangle wave signals, square wave signals, noise signals, sine wave signals, or combinations of two or more triangle wave signals, square wave signals, noise signals, or sine wave signals, with a plurality of parameters, including a plurality of magnitudes, frequencies, and phases. However, the implementation of the plurality of training signals $Y_1$ generated by the digital controller 12 is not limited thereto.

Accordingly, the implementation of the first vibration sensor 11 can be any first vibration sensor. The implementation of the first vibration sensor 11 is not intended to limit the present disclosure or exemplary embodiments thereof.

Accordingly, the implementation of the first vibration sensor 11 can be a contactor and a flexible piezopolymer, wherein the contactor is installed at specific positions on the surfaces of real objects, the contactor is attached to the flexible piezopolymer, the contactor vibrates in response to real vibrations V from real objects, the flexible piezopolymer vibrates in response to vibrations from the contactor, the flexible piezopolymer transforms vibrations from the flexible piezopolymer into first vibration sensor signals $X_1$, and the first vibration sensor 11 is connected to the digital controller 12 by a wired or wireless communication link. However, the implementation of the first vibration sensor 11 is not limited thereto.

Accordingly, the implementation of the digital controller 12 can be any digital controller. The implementation of the digital controller 12 is not intended to limit the present disclosure or exemplary embodiments thereof.

Accordingly, the implementation of the digital controller 12 can be an integrated electronic circuit, an electronic computer system, or a reprogrammable integrated electronic circuit comprising a neural network, wherein in training mode the neural network sequentially generates a plurality of training signals $Y_1$, sequentially transforms a plurality of second vibration sensor signals $X_2$ into a plurality of second vibration sensor signal samples, sequentially transforms the plurality of training signals $Y_1$ into a plurality of training signals samples, and identifies the transfer function thereof by which the digital controller 12 can sequentially transform the plurality of second vibration sensor signal samples into the plurality of training signals samples, and wherein in normal mode the neural network transforms first vibration sensor signals $X_1$ into first vibration sensor signal samples, transforms the first vibration sensor signal samples into controller signals samples according to the identified transfer function thereof, transforms the controller signal samples into controller signals $Y_1$, transforms second vibration sensor signals $X_2$ into second vibration sensor signal samples, compares the first vibration sensor signal samples and the second vibration sensor signals samples, verifies that the first vibration sensor signal samples and the second vibration signal samples are similar or the same, and retrains the controller 12 if the first vibration sensor signal samples and the second vibration signal samples are not similar or the same. However, the implementation of the digital controller 12 is not limited thereto.

Accordingly, the implementation of the actuator 13 can be any actuator. The implementation of the actuator 13 is not intended to limit the present disclosure or exemplary embodiments thereof.

Accordingly, the implementation of the actuator 13 can be a micro-speaker, wherein in training mode the micro-speaker transforms training signals $Y_1$ into vibrations $Y_1 T_A$, and wherein in normal mode the micro-speaker transforms controller signals $Y_1$ into realistic vibrations $Y_1 T_A$ that are similar to or the same as real vibrations V from real objects. However, the implementation of the actuator 13 is not limited thereto.

Accordingly, the implementation of the similar or identical second vibration sensor 14 can be any similar or identical second vibration sensor. The implementation of the similar or identical second vibration sensor 14 is not intended to limit the present disclosure or exemplary embodiments thereof.

Accordingly, the implementation of the similar or identical second vibration sensor 14 can be a contactor and a flexible piezopolymer, wherein the contactor is installed at a specific position on the surface of the actuator 13, the contactor is attached to the flexible piezopolymer, the contactor vibrates in response to vibrations $Y_1 T_A$ from the actuator, the flexible piezopolymer vibrates in response to vibrations from the contactor, and the flexible piezopolymer transforms vibrations from the flexible piezopolymer into second vibration sensor signals $X_2$. However the implementation of the similar or identical second vibration sensor 14 is not limited thereto.

Figure 1B:
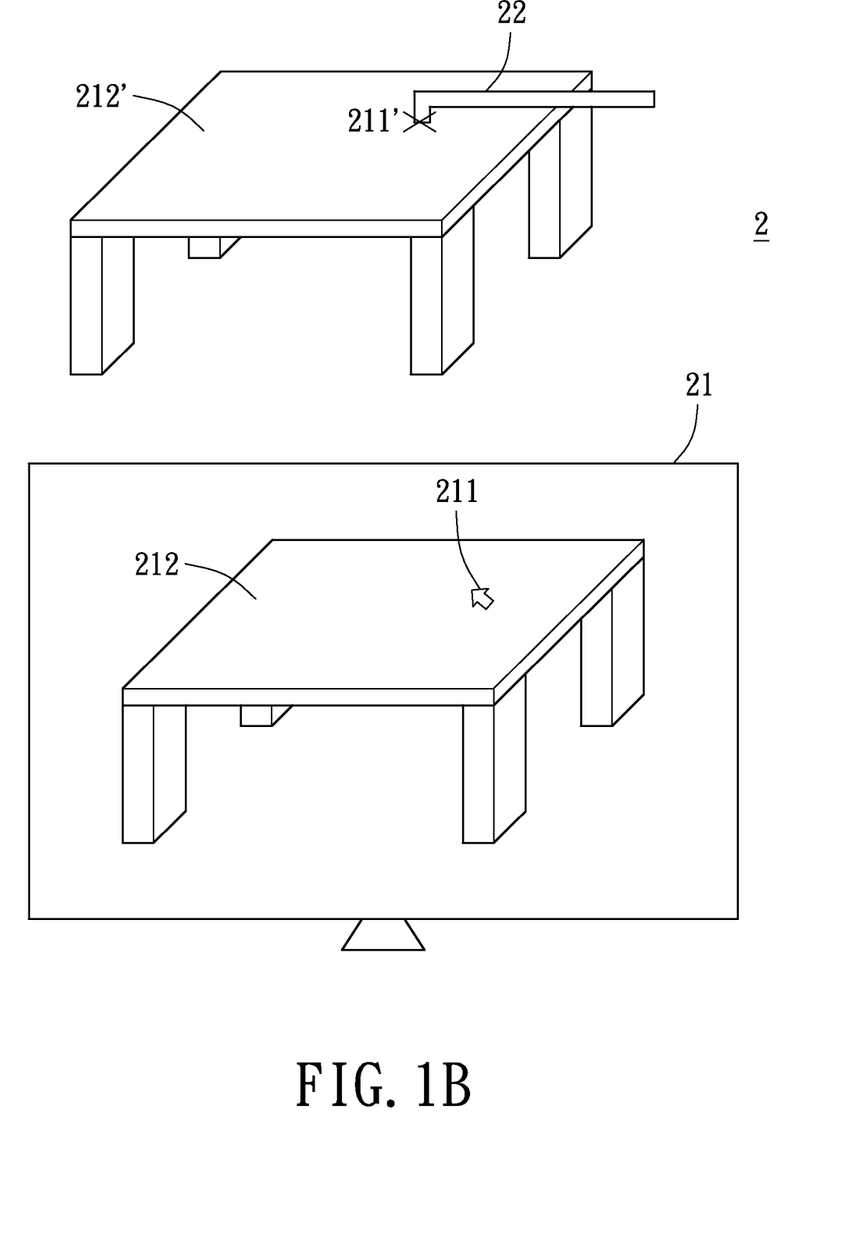
FIG. 1B is a block diagram of an exemplary application of a first exemplary embodiment of the present disclosure.

Referring to FIG. 1A and FIG. 1B, FIG. 1B is a block diagram of an application of a first exemplary embodiment of the present disclosure.

Accordingly, the teleoperator 2 in FIG. 1B comprises a virtual environment and a remote environment. The virtual environment comprises the touch screen display 21 of the teleoperator 2 in FIG. 1B and the controller 12, actuator 13, and similar or identical second vibration sensor 14 of the realistic tactile haptic device 1 in FIG. 1A. The remote environment comprises the movable mechanical arm 22 of the teleoperator 2 in FIG. 1B and the first vibration sensor 11 of the realistic tactile haptic device in FIG. 1A.

Accordingly, the first vibration sensor 11 is installed on the movable mechanical arm 22, the controller 12 and actuator 13 are installed in the touch screen display 21, and the similar or identical second vibration sensor 14 is installed in the touch screen display 21 on the surface of the actuator 13.

Accordingly, the teleoperator 2 displays a virtual object 212 on the touch screen display 21 in the virtual environment, and, when users touch position 211 on the surface of the virtual object 212 in the virtual environment, the moveable mechanical arm 22 moves the first vibration sensor 11 to position 211' on the surface of the remote object 212' in the remote environment, and the realistic tactile haptic device 1 comprising the first vibration sensor 11, controller 12, actuator 13, and similar or identical second vibration sensor 14 provides realistic tactile feedback that is similar to or the same as real tactile haptic feedback which users would experience by touching position 211' on the surface of the remote object 212' in the remote environment.

Accordingly, users can touch different positions 211 on the surface of the virtual object 212 in the virtual environment to experience realistic tactile haptic feedback that is similar to or the same as real tactile haptic feedback which users would experience by touching different positions 211' on the surface of the remote object 212' in the remote environment, wherein realistic tactile haptic feedback that is similar to or the same as real tactile haptic feedback which users would experience by touching different positions 211' on the surface of the remote object 212' in the remote environment is realistic surface texture feedback that is similar to or the same as real surface texture feedback which users would experience by touching different positions 211' on the surface of the remote object 212' in the remote environment.

Accordingly, the virtual object 212 in the virtual environment is a virtual table in the virtual environment, and the remote object 212' in the remote environment is a remote table in the remote environment. However, the virtual object 212 in the virtual environment and the remote object 212' in the remote environment are not limited thereto.

Accordingly, teleoperators comprising remote control devices, displays, and realistic tactile haptic feedback devices according to the first exemplary embodiment of the present disclosure could provide engineers with realistic tactile haptic feedback that is similar to or the same as real tactile haptic feedback which engineers would experience by interacting directly with remote objects.

Description of a Second Exemplary Embodiment

A second exemplary embodiment of the present disclosure provides a realistic tactile haptic feedback device that is identical to a realistic tactile haptic feedback device according to a first exemplary embodiment of the present disclosure with an additional signal generating unit, and a realistic tactile haptic feedback method thereof, wherein the device is small, light, and cost effective, so as to be practically useful, and wherein the device provides users with realistic tactile haptic feedback that is similar to or the same as real tactile haptic feedback which users would experience by touching real objects.

The realistic tactile haptic device can operate in training mode or normal mode. The digital controller must be trained, in training mode, before the digital controller can operate in normal mode. Training the digital controller comprises identifying the transfer function thereof.

In training mode, the realistic tactile haptic feedback device uses the digital controller, the actuator, and the similar or identical second vibration sensor to identify the transfer function of the digital controller.

In normal mode, the realistic tactile haptic feedback device uses the first vibration sensor, the digital controller, and the additional signal generating unit to store first vibration sensor signals from one or more real objects, and subsequently uses the digital controller, the actuator, the similar or identical second vibration sensor, and the additional signal generating unit, to provide users with realistic tactile haptic feedback that is similar to or the same as real tactile haptic feedback which users would experience by touching real objects.

Reference will now be made, in detail, to the accompanying drawings which illustrate the aforementioned second exemplary embodiment of the present disclosure. The same reference numbers are used in the description and in the accompanying drawings to refer to the same or like parts.

Figure 2A:
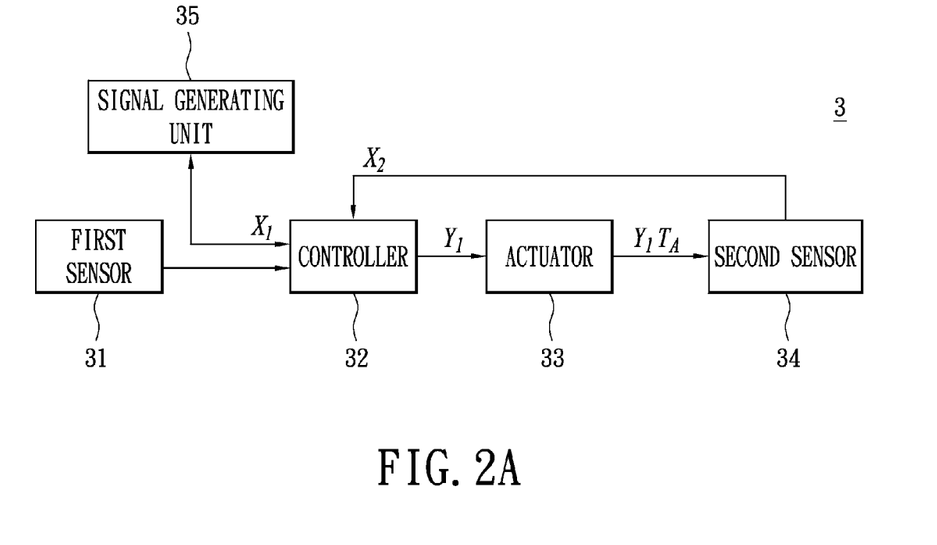
FIG. 2A is a block diagram of a second exemplary embodiment of the present disclosure.

Referring to FIG. 2A, FIG. 2A is a block diagram of a second exemplary embodiment of the present disclosure.

Accordingly, a second exemplary embodiment of the present disclosure provides a realistic tactile haptic feedback device 3 comprising a first vibration sensor 31, a digital controller 32, an actuator 33, a similar or identical second vibration sensor 34, and an additional signal generating unit 35, and a realistic tactile haptic feedback method thereof, wherein the device 3 is small, light, and cost effective, so as to be practically useful, and wherein the device 3 provides users with realistic tactile haptic feedback that is similar to or the same as real tactile haptic feedback which users would experience by touching real objects.

Accordingly, the realistic tactile haptic device 3 can operate in training mode or normal mode. The digital controller 32 must be trained, in training mode, before the digital controller 32 can operate in normal mode.

Accordingly, in training mode, the realistic tactile haptic feedback device 3 uses the digital controller 32, the actuator 33, and the similar or identical second vibration sensor 34 to identify the transfer function of the digital controller 32.

Accordingly, in normal mode, the realistic tactile haptic feedback device 3 uses the first vibration sensor 31, the digital controller 32, and the additional signal generating unit 35 to store first vibration sensor signals $X_1$ from one or more real objects, and subsequently uses the digital controller 32, the actuator 33, the similar or identical second vibration sensor 34, and the additional signal generating unit 35 to provide users with realistic tactile haptic feedback that is similar to or the same as real tactile haptic feedback which users would experience by touching real objects.

Accordingly, the descriptions of the first vibration sensor 31, the digital controller 32, the actuator 33, and the similar or identical second vibration sensor 34 of the realistic tactile haptic feedback device 3 in FIG. 2A are respectively the same as the descriptions of the first vibration sensor 11, the digital controller 12, the actuator 13, and the similar or identical second vibration sensor 14 of the realistic tactile haptic feedback device 1 in FIG. 1A.

Accordingly, the first vibration sensor 31, the digital controller 32, and the additional signal generating unit 35 of the realistic tactile haptic feedback device 3 in FIG. 2A store signals $X_1$ from one or more real objects and, subsequently the digital controller 32, the actuator 33, the similar or identical second vibration sensor 34 use stored first vibration sensor signals $X_1$ from one or more real objects to provide users with realistic tactile haptic feedback that is similar to or the same as real tactile haptic feedback which users would experience by touching real objects, according to virtual objects that are displayed by a virtual environment in which the realistic tactile haptic device 3 in FIG. 2A is comprised.

Figure 2B:
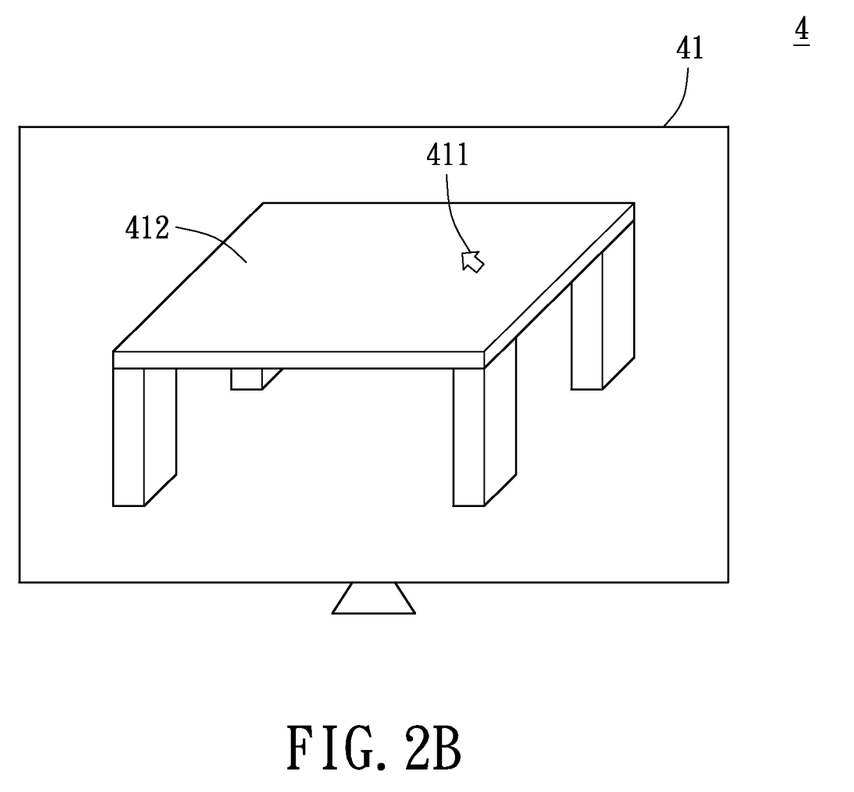
FIG. 2B is a block diagram of an exemplary application of a second exemplary embodiment of the present disclosure.

Referring to FIG. 2A and FIG. 2B, FIG. 2B is a block diagram of an exemplary application of a second exemplary embodiment of the present disclosure.

Accordingly, the virtual environment 4 in FIG. 2B comprises the touch screen display 41 of the virtual environment 4 in FIG. 2B and the digital controller 32, the actuator 33, the similar or identical second vibration sensor 34, and the additional signal generating unit 35 of the realistic tactile haptic device 3 in FIG. 2A.

Accordingly, the first vibration sensor 31, the digital controller 32, the actuator 33, the similar or identical second vibration sensor 34, and the additional signal generating unit 35 are installed in the touch screen display 41, and the similar or identical second vibration sensor 34 is installed on the surface of the actuator 33.

Accordingly, the virtual environment 4 displays a virtual object 412 on the touch screen display 41 in the virtual environment 4, and, when users touch position 411 on the surface of the virtual object 412 in the virtual environment 4, the realistic tactile haptic device 3 comprising the additional signal generating unit 35, controller 32, actuator 33, and similar or identical second vibration sensor 34 provides users with realistic tactile feedback that is similar to or the same as real tactile haptic feedback which users would experience by touching the same position on the surface of a remote object, a real object, or a virtual (synthetic) object derived from real objects in a remote environment, a real environment, or a virtual (synthetic) environment derived from real objects.

Accordingly, users can touch different positions 411 on the surface of the virtual object 412 in the virtual environment to experience realistic tactile haptic feedback that is similar to or the same as real tactile haptic feedback which users would experience by touching different positions on the surface of a remote object, a real object, or a virtual (synthetic) object derived from real objects in a remote environment, a real environment, or a virtual (synthetic) environment derived from real objects, wherein realistic tactile haptic feedback that is similar to or the same as real tactile haptic feedback which users would experience by touching different positions on the surface of a remote object, a real object, or a virtual (synthetic) object derived from real objects in a remote environment, real environment, or virtual (synthetic) environment derived from real objects is realistic surface texture feedback that is similar to or the same as real surface texture feedback which users would experience by touching different positions on the surface of a remote object, a real object, or a virtual (synthetic) object derived from real objects in a remote environment, a real environment, or a virtual (synthetic) environment derived from real objects.

Accordingly, the virtual object 412 in the virtual environment is a virtual table in the virtual environment. However, the virtual object 412 in the virtual environment is not limited thereto.

Accordingly, virtual environments comprising computer-aided-design tools, displays, and realistic tactile haptic feedback devices according to the second exemplary embodiment of the present disclosure could provide designers with realistic tactile haptic feedback that is similar to or the same as real tactile haptic feedback designers would experience by interacting directly with real products.

Accordingly, virtual environments comprising scientific equipment, displays, and realistic tactile haptic feedback devices according to the second exemplary embodiment of the present disclosure could provide scientists with realistic tactile haptic feedback that is similar to or the same as real tactile haptic feedback which scientists would experience by interacting directly with virtual (synthetic) microscopic objects derived from real objects.

Accordingly, virtual environments comprising computer systems, displays, and realistic tactile haptic devices that are small, light, and cost effective according to the second exemplary embodiment of the present disclosure could provide computer users with realistic tactile haptic feedback that is similar to or the same as real tactile haptic feedback which computer users would experience by interacting directly with remote objects, real objects, or virtual (synthetic) objects derived from real objects.

Description of a Transfer Function Identifying Device

Figure 3:
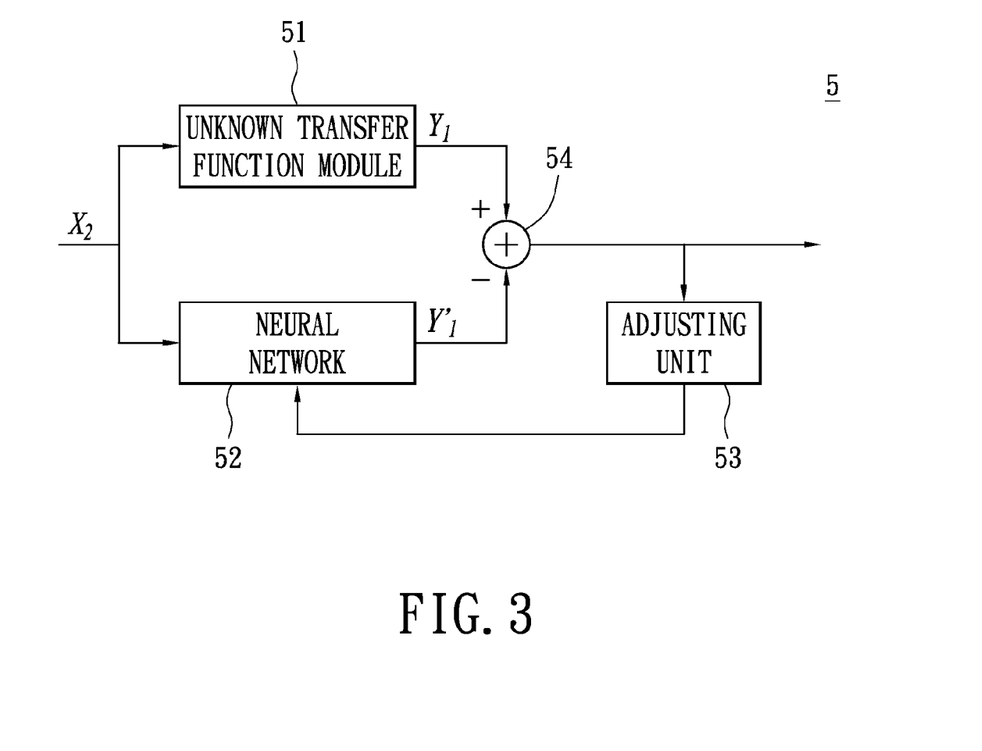
FIG. 3 is a block diagram of a transfer function identifying device of a first or second exemplary embodiment of the present disclosure.

Referring to FIG. 3, FIG. 3 is a block diagram of a transfer function identifying device 5 according to a first or second exemplary embodiment of the present disclosure.

Accordingly, the digital controller 12 in FIG. 1A and the digital controller 32 in FIG. 2A respectively comprise transfer function identifying devices.

Accordingly, the implementation of the transfer function identifying device 5 can be any transfer function identifying device. The implementation of the transfer function identifying device 5 is not intended to limit the present disclosure or exemplary embodiments thereof.

Accordingly, the implementation of the transfer function identifying device 5 can be an electronic integrated circuit, an electronic computer system, or a reprogrammable electronic integrated circuit comprising an unknown transfer function module 51, a neural network controller 52, an adjusting unit 53, and a subtractor 54, wherein the transfer function of the unknown transfer function module 51 is the unknown transfer function of the digital controller 12 or the unknown transfer function of the digital controller 32, wherein in training mode, the transfer function of the unknown transfer function module 51 transforms second vibration sensor signals $X_2$ into training signals $Y_1$, wherein in training mode, the transfer function of the neural network controller 52 transforms second vibration sensor signals $X_2$ into estimated training signals $Y_1'$, and wherein in normal mode, the identified transfer function of the neural network controller 52 transforms first vibration sensor signals $X_1$ into controller signals $Y_1$. However, the implementation of the transfer function identifying device is not limited thereto.

Accordingly, the implementation of the neural network controller 52 can be any neural network controller. The implementation of the neural network controller 52 is not intended to limit the present disclosure or exemplary embodiments thereof.

Accordingly, the implementation of the neural network controller 52 can be a multilayer perceptron (MLP) neural network (NN). However, the implementation of the neural network controller 52 is not limited thereto.

Accordingly, the implementation of the transfer function identifying method of the transfer function identifying device 5 can be any transfer function identifying method. The implementation of the transfer function identifying method of the transfer function identifying device 5 is not intended to limit the present disclosure or exemplary embodiments thereof.

Accordingly, the implementation of the transfer function identifying method of the transfer function identifying device 5 can be MLP neural network training. However, the implementation of the transfer function identifying method of the transfer function identifying device 5 is not limited thereto.

Accordingly, in training mode, transfer function of the neural network controller 52 transforms second vibration sensor signals $X_2$ into estimated training signals $Y_1'$, the subtractor 54 subtracts estimated training signals $Y_1'$ from training signals $Y_1$ to create differential signals, and the adjusting unit 53 adjusts the transfer function of the neural network controller 52 according to the differential signals, and thereby reduces the magnitudes of the differential signals.

Accordingly, the adjusting unit 53 iteratively adjusts the transfer function of the neural network controller 52, reduces the magnitudes of the differential signals to a specified acceptable range, and thereby makes the transfer function of the neural network 52 similar to or the same as the transfer function of the unknown transfer function module 51, wherein the transfer function of the unknown transfer function module 51 is the transfer function of the digital controller 12 or the digital controller 32 by which the digital controller 12 or the digital controller 32 can transform the second vibration sensor signals $X_2$ into the training signals $Y_1$.

Description of a Realistic Tactile Haptic Feedback Method

Figure 4:
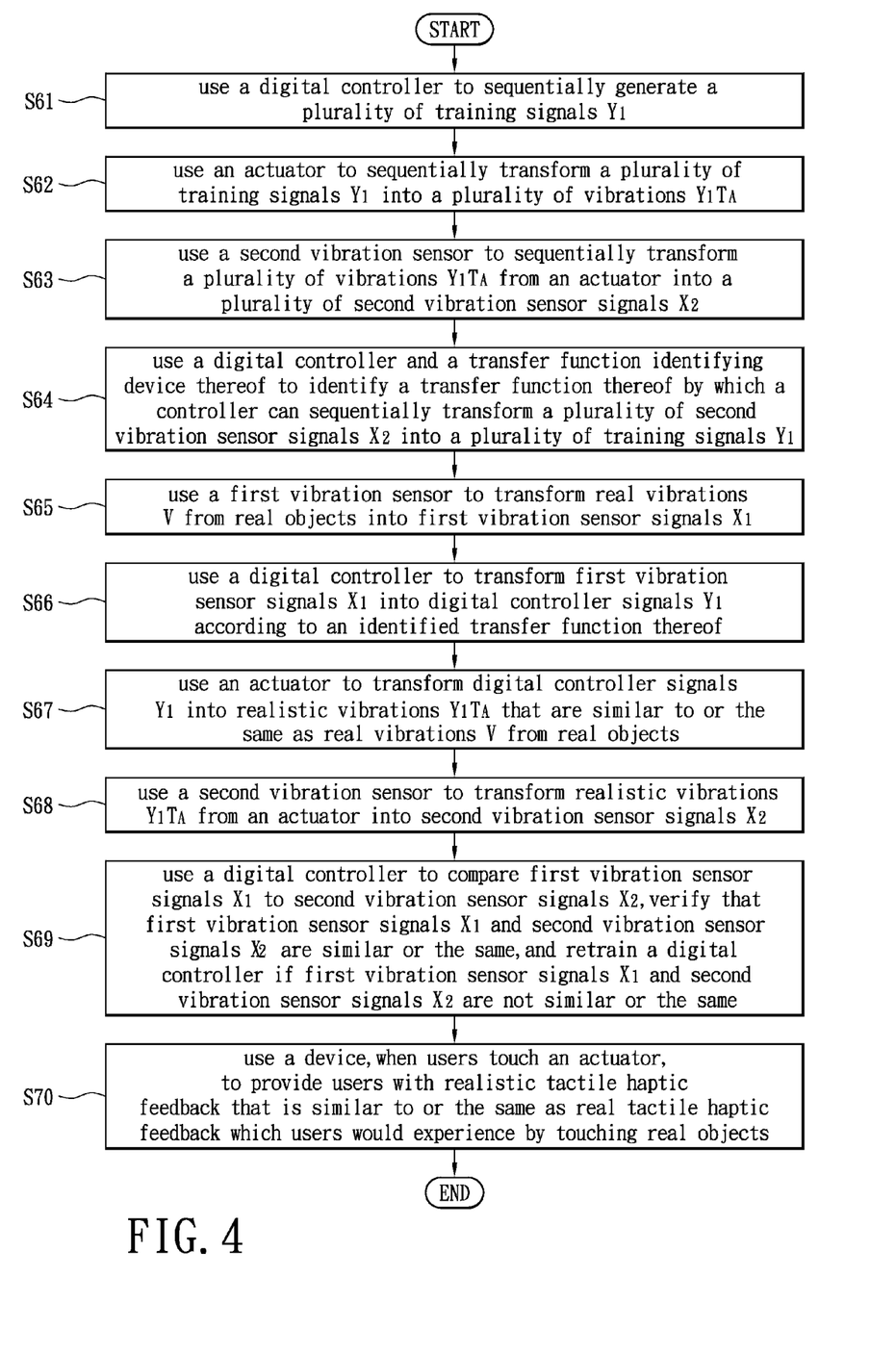
FIG. 4 is a flow chart of a realistic tactile haptic feedback method of a first or second exemplary embodiment of the present disclosure.

Referring to FIG. 4, FIG. 4 is a flow chart of a realistic tactile haptic feedback method 4 according to a first or second exemplary embodiment of the present disclosure.

In training mode, at step S61, the method uses a digital controller to sequentially generate a plurality of training signals $Y_1$, at step S62, the method uses an actuator to sequentially transform a plurality of training signals $Y_1$ into a plurality of vibrations $Y_1T_A$, at step S63, the method uses a second vibration sensor to sequentially transform a plurality of vibrations $Y_1T_A$ from an actuator into a plurality of second vibration sensor signals $X_2$, and, at step S64, the method uses a digital controller and a transfer function identifying device thereof to identify a transfer function thereof by which a controller can sequentially transform a plurality of second vibration sensor signals $X_2$ into a plurality of training signals $Y_1$.

In normal mode, at step S65, the method uses a first vibration sensor to transform real vibrations V from real objects into first vibration sensor signals $X_1$, at step S66, the method uses a digital controller to transform first vibration sensor signals $X_1$ into digital controller signals $Y_1$ according to an identified transfer function thereof, at step S67, the method uses an actuator to transform digital controller signals $Y_1$ into realistic vibrations $Y_1T_A$ that are similar to or the same as real vibrations V from real objects, at step S68, the method uses a second vibration sensor to transform realistic vibrations $Y_1T_A$ from an actuator into second vibration sensor signals $X_2$, at step S69, the method uses a digital controller to compare first vibration sensor signals $X_1$ to second vibration sensor signals $X_2$, verify that first vibration sensor signals $X_1$ and second vibration sensor signals $X_2$ are similar or the same, and retrains a digital controller if first vibration sensor signals $X_1$ and second vibration sensor signals $X_2$ are not similar or the same, and, at step S70, the method uses a device, when users touch an actuator, to provide users with realistic tactile haptic feedback that is similar to or the same as real tactile haptic feedback which users would experience by touching real objects.

Scope of the Present Disclosure

The aforementioned descriptions and accompanying drawings represent exemplary embodiments of the present disclosure. The aforementioned descriptions and accompanying drawings are not intended to limit the scope of the present disclosure thereto. Various equivalent changes, alternations, or modifications which the claims of the present disclosure comprise are all consequently viewed as being embraced by the scope of the present disclosure.

What is claimed is:

1. A realistic tactile haptic feedback device, comprising:
    a first sensor which in normal mode is used to transform real tactile haptic features of real objects into first sensor signals;
    a controller which in normal mode is used to transform the first sensor signals into controller signals according to a transfer function thereof;
    an actuator which in normal mode is used to transform the controller signals into realistic tactile haptic features; and
    a second sensor which in normal mode is used to transform realistic tactile haptic features from the actuator into a plurality of second sensor signals;
    wherein in training mode, the controller sequentially generates a plurality of training signals, the actuator sequentially transforms the plurality of training signals into a plurality of tactile haptic features, the second sensor sequentially transforms the plurality of tactile haptic features from the actuator into the plurality of second sensor signals, and the controller identifies the transfer function thereof by which the controller can sequentially transform the plurality of second sensor signals into the plurality of training signals;
    wherein in normal mode, the first sensor, the controller, the actuator, and the second sensor transform real tactile haptic features of real objects into realistic tactile haptic features that are substantially identical to real tactile haptic features of real objects and, when users directly or indirectly touch the actuator, provide users with realistic tactile haptic feedback that is substantially identical to real tactile haptic feedback which users would experience by touching real objects.

2. The realistic tactile haptic feedback device according to claim 1, comprising:
    the first sensor which in normal mode is used to transform real tactile haptic features of real objects into the first sensor signals;
    wherein real tactile haptic features of real objects are real position, shape, flexibility, surface texture, or temperature features of real objects at specific positions on the surfaces of real objects.

3. The realistic tactile haptic feedback device according to claim 1, further comprising:
    a signal generating unit which in normal mode is used to store the first sensor signals;
    wherein the first sensor signals are the first sensor signals from real tactile haptic features of real objects.

4. The realistic tactile haptic feedback device according to claim 1, further comprising:
    a signal generating unit which in normal mode is used to provide stored first sensor signals to the controller;
    wherein stored first sensor signals are stored first sensor signals for remote objects, real objects, or virtual (synthetic) objects that are derived from real objects.

5. The realistic tactile haptic feedback device according to claim 1, comprising:
    the controller which in normal mode is used to transform the first sensor Signals into the controller signals according to the transfer function thereof;
    wherein the transfer function of the controller is related to a transfer function of the first sensor, a transfer function of installation effects of the first sensor, a transfer function of the actuator, a transfer function of the second sensor, and a transfer function of installation effects of the second sensor.

6. The realistic tactile haptic feedback device according to claim 1, comprising:
    the actuator which in normal mode is used to transform the controller signals into realistic tactile haptic features;
    wherein the realistic tactile haptic features are substantially identical to real tactile haptic features of real objects.

7. The realistic tactile haptic feedback device according to claim 1, comprising:
    the second sensor which in normal mode is used to transform realistic tactile haptic features of the actuator into the second sensor signals;
    wherein realistic tactile haptic features of the actuator are substantially identical to real tactile haptic features of real objects.

8. The realistic tactile haptic feedback device according to claim 1, comprising:
    the controller which in training mode sequentially generates the plurality of training signals;
    wherein the plurality of training signals is a plurality of triangle wave signals, square wave signals, noise signals, sine wave signals, or combinations of two or more triangle wave signals, square wave signals, noise signals, or sine wave signals, with a plurality of magnitudes, frequencies, or phases.

9. The realistic tactile haptic feedback device according to claim 1, comprising:
the controller which in training mode identifies the transfer function thereof;
wherein identifying the transfer function of the controller comprises using any transfer function identifying device and any transfer function identifying method thereof to identify the transfer function of the controller;
wherein using any transfer function identifying device and any transfer function identifying method thereof to identify the transfer function of the controller includes using any transfer function identifying device and any system identification, neural network training, or iterative least squares estimation transfer function identifying method thereof to identify the transfer function of the controller;
wherein using any transfer function identifying device and any transfer function identifying method thereof to identify the transfer function of the controller includes using any transfer function identifying device and any neural network training transfer function identifying method thereof to identify the transfer function of the controller;
wherein using any transfer function identifying device and any neural network training transfer function identifying method thereof to identify the transfer function of the controller includes any transfer function identifying device, comprising an unknown function module, a neural network controller, a subtractor, and an adjusting unit, and any neural network training method thereof to identify the transfer function of the controller.

10. The realistic tactile haptic feedback device according to claim 1, comprising:
the controller which in training mode identifies the transfer function thereof;
wherein the controller comprises a transfer function identifying device and a transfer function identifying method thereof;
wherein the transfer function identifying device and the transfer function identifying method thereof comprises:
an unknown transfer function module which sequentially generates the plurality of training signals;
a neural network controller which sequentially transforms the plurality of second sensor signals into a plurality of estimated training signals, according to a neural network controller transfer function thereof;
a subtractor which sequentially subtracts the plurality of estimated training signals from the plurality of training signals and sequentially generates a plurality of differential signals;
an adjusting unit which sequentially adjusts the neural network controller transfer function according to the plurality of differential signals.

11. The realistic tactile haptic feedback device according to claim 1, comprising the first sensor, the controller, the actuator, and the second sensor, and a realistic tactile haptic feedback method thereof;
wherein the realistic tactile haptic feedback method comprises:
using the controller in training mode to sequentially generate the plurality of training signals;
using the actuator in training mode to sequentially transform the plurality of training signals into a plurality of tactile haptic features;
using the second sensor in training mode to sequentially transform the plurality of tactile haptic features of the actuator into the plurality of second sensor signals;
using the controller in training mode to identify the transfer function thereof by which the controller can sequentially transform the plurality of second sensor signals into the plurality of training signals;
using the first sensor in normal mode to transform real tactile haptic features of real objects into the first sensor signals;
using the controller in normal mode to transform the first sensor signals into the controller signals according to an identified transfer function thereof;
using the actuator in normal model to transform the controller signals into realistic tactile haptic features that are substantially identical to real tactile haptic features of real objects;
using the second sensor in normal mode to transform realistic tactile haptic features of the actuator into the second sensor signals;
using the controller in normal mode to compare the first sensor signals to the second sensor signals, verify that the first sensor signals and the second sensor signals are substantially identical, and retrain the controller if the first sensor signals and the second sensor signals are not substantially identical;
using the first sensor, the controller, the actuator, and the second sensor in normal mode, when users directly or indirectly touch the actuator, to provide users with realistic tactile haptic feedback that is substantially identical to real tactile haptic feedback which users would experience by touching real objects.

12. The realistic tactile haptic feedback device according to claim 11, comprising the first sensor, the controller, the actuator, and the second sensor, and the realistic tactile haptic feedback method thereof:
wherein the transfer function of the controller is related to the transfer function of the first sensor, the transfer function of installation effects of the first sensor, the transfer function of the actuator, the transfer function of the second sensor, and the transfer function of installation effects of the second sensor.

* * * * *